United States Patent
Kim et al.

(10) Patent No.: US 11,749,831 B2
(45) Date of Patent: Sep. 5, 2023

(54) LI—S BATTERY WITH CARBON COATED SEPARATOR

(71) Applicant: SCEYE SA, Zug (CH)

(72) Inventors: David Kim, Santa Fe, NM (US); Xiangwu Zhang, Cary, NC (US); Jiadeng Zhu, Charlottesville, VA (US)

(73) Assignee: SCEYE SA, Zug (CH)

( * ) Notice: Subject to any disclaimer, the term of this patent is extended or adjusted under 35 U.S.C. 154(b) by 0 days.

(21) Appl. No.: 15/756,714

(22) PCT Filed: Sep. 2, 2015

(86) PCT No.: PCT/EP2015/070030
§ 371 (c)(1),
(2) Date: Mar. 1, 2018

(87) PCT Pub. No.: WO2017/036522
PCT Pub. Date: Mar. 9, 2017

(65) Prior Publication Data
US 2018/0287121 A1 Oct. 4, 2018

(51) Int. Cl.
*H01M 10/052* (2010.01)
*H01M 50/44* (2021.01)
(Continued)

(52) U.S. Cl.
CPC ......... *H01M 10/052* (2013.01); *H01M 4/382* (2013.01); *H01M 10/0585* (2013.01);
(Continued)

(58) Field of Classification Search
CPC ............. H01M 2/1666; H01M 2/0222; H01M 2/1613; H01M 2/166; H01M 2/1686;
(Continued)

(56) References Cited

U.S. PATENT DOCUMENTS 6,749,961 B1  6/2004  Nguyen
8,012,622 B2  9/2011  Kono
(Continued)

FOREIGN PATENT DOCUMENTS

CN  102185158 A  9/2011
CN  102832379 A  12/2012
(Continued)

OTHER PUBLICATIONS

Yao et al., "Improved lithium-sulfur batteries with a conductive coating on the separator to prevent the accumulation of inactive S-related species at the cathode-separator interface" Energy & Environmental Science, Jul. 14, 2014 pp. 3381-3390 (Year: 2014).*
(Continued)

*Primary Examiner* — Amanda C. Walke
*Assistant Examiner* — Niara Trant
(74) *Attorney, Agent, or Firm* — Cermak Nakajima & McGowan LLP; James Creighton Wray

(57) ABSTRACT

A Li—S battery cell comprising a Sulphur-containing cathode, a Lithium-containing anode, a separator in between the cathode and anode with an electrolyte on both sides of the separator filling interspaces between the anode and the cathode. The separator contains electrically conducting carbon and prevents polysulphide intermediates from migrating from the Sulphur-containing cathode to the Lithium anode.

15 Claims, 10 Drawing Sheets

Figure 1A:
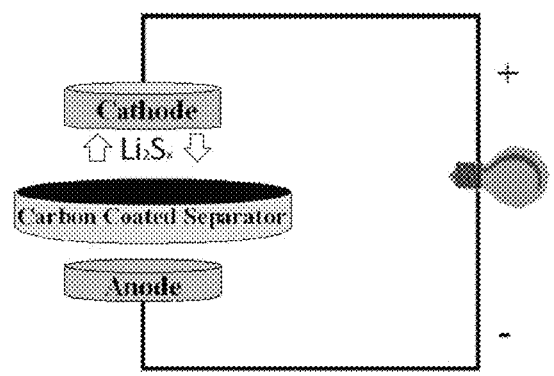

(51) Int. Cl.
*H01M 50/109* (2021.01)
*H01M 50/446* (2021.01)
*H01M 50/437* (2021.01)
*H01M 50/451* (2021.01)
*H01M 50/454* (2021.01)
*H01M 4/38* (2006.01)
*H01M 10/0585* (2010.01)

(52) U.S. Cl.
CPC ....... *H01M 50/109* (2021.01); *H01M 50/437* (2021.01); *H01M 50/44* (2021.01); *H01M 50/446* (2021.01); *H01M 50/451* (2021.01); *H01M 50/454* (2021.01)

(58) Field of Classification Search
CPC .............. H01M 4/382; H01M 10/052; H01M 10/0585; H01M 50/449; H01M 50/109; H01M 50/44; H01M 50/446; H01M 50/431; H01M 50/437; H01M 50/454; H01M 50/451
See application file for complete search history.

(56) References Cited

U.S. PATENT DOCUMENTS

| | | | |
|---|---|---|---|
| 8,652,671 B2 | 2/2014 | Tanizaki | |
| 9,391,310 B2 | 7/2016 | Barchasz | |
| 2007/0065728 A1* | 3/2007 | Zhang | H01M 4/134 429/231.95 |
| 2013/0244119 A1 | 9/2013 | Schaefer | |
| 2013/0309571 A1 | 11/2013 | Yoon | |
| 2014/0106239 A1* | 4/2014 | Barchasz | B01D 69/02 429/338 |
| 2014/0186724 A1 | 7/2014 | Hammond | |
| 2014/0217992 A1 | 8/2014 | Li | |
| 2014/0234702 A1 | 8/2014 | Zhang | |
| 2014/0272597 A1 | 9/2014 | Mikhaylik | |
| 2015/0014890 A1 | 1/2015 | Xiao | |
| 2015/0056507 A1 | 2/2015 | Dadheech | |
| 2015/0084604 A1 | 3/2015 | Thillaiyan | |
| 2015/0099157 A1 | 4/2015 | Ketzer | |
| 2015/0118574 A1 | 4/2015 | Visbal | |
| 2015/0188109 A1 | 7/2015 | Kim | |
| 2015/0318532 A1 | 11/2015 | Manthiram | |
| 2016/0380256 A1* | 12/2016 | Stein | H01M 4/04 429/217 |

FOREIGN PATENT DOCUMENTS

| | | |
|---|---|---|
| DE | 102013018235 A1 | 4/2015 |
| JP | 2006012587 A * | 1/2006 |
| WO | 2014028218 A1 | 2/2014 |
| WO | 2014047126 A1 | 3/2014 |
| WO | 2014159903 A2 | 10/2014 |

OTHER PUBLICATIONS

JP2006012587A Takahashi Espacenet Machine Translation (Year: 2006).*
Zhang et al., "A functional carbon layer-coated separator for high performance lithium sulfur batteries" Solid State Ionic, vol. 278, pp. 166-171, pub. Jun. 24, 2015, hereinafter Zhang (Year: 2015).*
Balach et al., "Functional Mesoporous Carbon-coated Separator for Long-Life High Energy Lithium-Sulfur Batteries", Advanced Functional Materials, vol. 25, Issue 33, 2015, 5285-5291.
Chung et al., "High-Performance Li—S Batteries with an Ultralightweight MWCNTCoated Separator", J. Phys. Chem. Lett. 2014, 5, 1978-1983.
Fu et al., "Sulfur gradient-distributed CNF composite: a self-inhibiting cathode for binder-free lithium-sulfur batteries", Chem. Commun., 2014, 50, 10277.
Helen et al., "Single step transformation of sulphur to $Li_2S_2/Li_2S$ in Li—S batteries", (2005) Scientific Reports | 5:12146 | DOI: 10.1038/srep12146 (www.nature.com/scientificreports).
Huang et al., "Ionic shield for polysulfides towards highly-stable lithium-sulfur batteries" Energy Environ. Sci., 2014, 7, 347 (https://www.researchgate.net/publication/288919544).
Jin et al., "Application of lithiated Nafion ionomer film as functional separator for lithium sulfur cells" Journal of Power Sources 218 (2012) 163-167.
Li et al., "Understanding the Role of Different Conductive Polymers in Improving the Nanostructured Sulfur Cathode Performance", (2013) dx.doi.org/10.1021/nl403130h | Nano Lett. 2013, 5534-5540.
Su and Manthiram "Lithium-sulphur batteries with a microporous carbon paper as a bifunctional interlayer", Nature Communications 2013.
Yao et al. "Improved lithium-sulfur batteries with a conductive coating on the separator to prevent the accumulation of inactive S-related species at the cathode-separator interface" Energy & Environmental Science, DOI: 10.1039/c4ee01377h, (2014).
Zhang et al., "A graphene-oxide-based thin coating on the separator: an efficient barrier towards highstable lithium-sulfur batteries", 2D Mater. 2 (2015) 024013.
Zhou et al, "A Graphene-Pure-Sulfur Sandwich Structure for Ultrafast, Long-Life Lithium-Sulfur Batteries" published in Adv. Mater 2014, 26, 625-631.

* cited by examiner

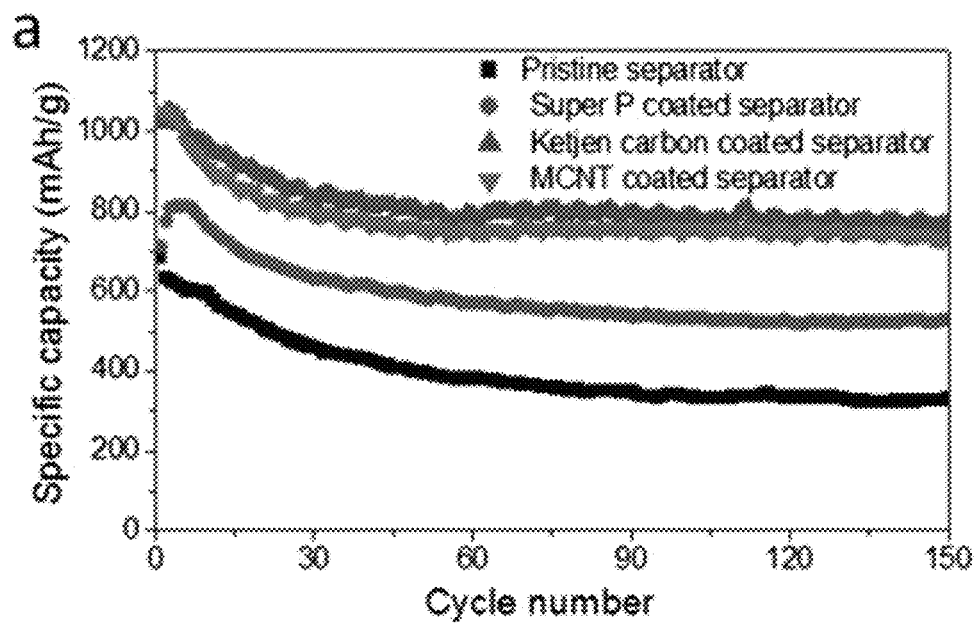
FIG. 10 (prior art – Yao et al.)
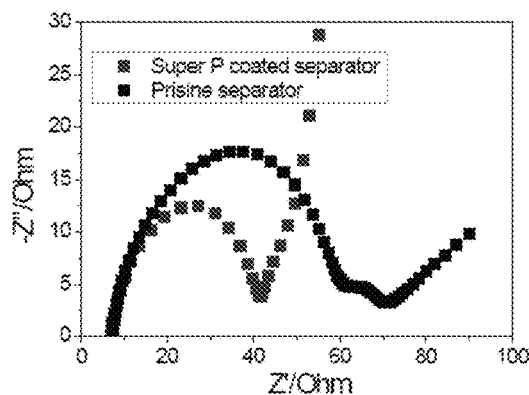
FIG. 11a (prior art – Yao et al.)
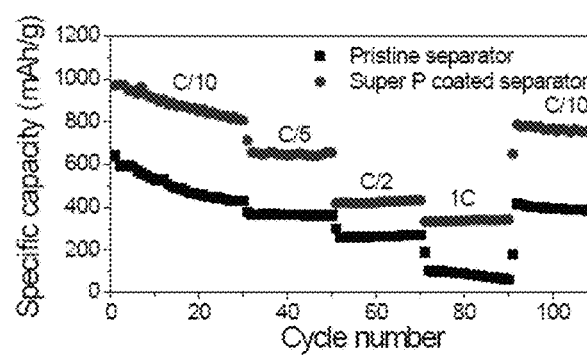
FIG. 11b (prior art – Yao et al.)

US 11,749,831 B2

LI—S BATTERY WITH CARBON COATED SEPARATOR

FIELD OF THE INVENTION

The present invention relates to Li—S batteries with carbon coated separators between the electrodes.

BACKGROUND OF THE INVENTION

Due to their superior energy storage capacity in terms of Wh/kg (Watt*hour/kilogram) as compared to Lithium ion (Li-ion) batteries, efforts are targeting improvements of Lithium Sulphur (Li—S) batteries, especially with respect to improving the electrode capacity as well as improving the lifetime of the battery. The latter includes prevention or reduction of migration of polysulphide intermediates ($Li_2S_x$, x=4, x=6, or x=8) through the electrolyte to the Li electrode. Polysulphides are intermediates created during the charging and discharging cycles. Once, the polysulphides reach the Li electrode, they get deposited and reduce the capacity of the battery.

In some attempts for prevention of migration of polysulphides, carbon is provided on or in the Sulphur cathode. Examples include US2015/014890 and US2015/05607. Another example is disclosed in the article "Sulfur gradient-distributed CNF composite: a self-inhibiting cathode for binder-free Lithium-batteries", by Fu et al., published by The Royal Society of Chemistry in Chem. Commun. 2014, 50, 10277-10280 ([www.rsc.org/chemcomm]-DOI: 10.1039/c4cc04970e). As reported in this article, a carbon nanofiber-Sulphur composite is provided via Sulphur vapour deposition in a carbon nanofiber net, thereby providing a gradient cathode.

A different attempt to prevent the migration of polysulphide is disclosed in International patent application WO2014/028218 by Manthiram et al., where a porous carbon sheet is provided between the Sulphur cathode and the Lithium anode, especially between the Sulphur cathode and the separator. Preferably, the carbon interlayer is made of multiwall carbon nanotubes (MWCNT).

A further attempt is disclosed by Yao et al. in the article "Improved Lithium-sulfur batteries with a conductive coating on the separator to prevent the accumulation of inactive S-related species at the cathode-separator interface", published in August 2014 by The Royal Society of Chemistry in *Energy & Environmental Science* 7, pp. 3381-3390 (www.rsc.org/ees-DOI: 10.1039/c4ee01377h), accessible on the Internet From this article, the FIG. 7a on the battery capacity has been reproduced as FIG. 10 in the herein presented drawings for later comparison. A porous Celgard PP (polypropylene) membrane separator was coated with carbon slurry on one side. For the slurry, carbon black was mixed into polyvinylidene-fluoride (PVDF) as a binder material with a weight ratio of 9:1 between carbon and PVDF. Alternatively, metal oxide nanopartides, carbon black and PVDF at a weight ratio 4.5:4.5:1 were dispersed in N-methylpyrrolidone (NMP) forming a slurry. The slurry was smeared onto the separator by a doctor blade into layer of 1 micron thickness. The explicit teaching in this document is that of the carbon layer should be in the order of a micron, and such very thin layer was regarded as advantageous in the article as compared to earlier works where "the thickness (tens of microns) and the mass (several miligrams) of these interlayers are rather large, which if not reduced would substantially decrease the specific capacity of the cell" (quotation from the article).

This article by Yao et al. is supplemented by some further explanatory graphs in a further publication with the same title and the same authors, published on the Internet as Electronic Supplementary Material (ESI) for *Energy & Environmental Science*. From this supplementary article, the supplementary figures S2 and S3 are reproduced herein in the drawings FIG. 11a and FIG. 11b, as these figures are used for comparison later.

It should be emphasized in relation to the Celgard PP separator of Yao et al. that, although, microporous polyolefin membranes are the most commonly-used separators for Lithium batteries due to their good chemical stability and mechanical strength, such membranes suffer from low porosity and poor wettability with liquid electrolyte. The result is an increase of the cell resistance, resulting in poor kinetics and low rate capability of the batteries. In addition, polyolefin-based separators exhibit large thermal shrinkage at high temperatures which may cause internal short circuits, fire and even explosions in case of overcharge or overheating A further attempt for improvement is found in the article "A graphene-oxide-based thin coating on the separator: an efficient barrier towards high-stable Lithium-sulfur batteries" by Yunbo Zhang et al., published by 2D Mater. 2 (2015) 024013 (doi:10.1088/2053-1583/2/2/024013), which is accessible on the Internet site [http://www.researchgate.net/publication/277732546_A_graphene-oxide-based _thin_coating_on_the_separator_an_efficient_barrier_towards_high-stable _Lithiumsulfur_batteries spray-coating of a mixture of graphene oxides (GO) and oxidized carbon nanotubes (o-CNT)]. A thin a thin barrier layer on a polypropylene separator was provided by spray-coating of a mixture of graphene oxides (GO) and oxidized carbon nanotubes (o-CNT). A specific capacity of up to 750 mAh/g was achieved at 1 C after 100 cycles. Up to 35 charging cycles, no difference in capacity was seen between the coated separator and the uncoated separator configurations, if the charging speed was 0.25 C. Only at higher rates, the difference was significant.

In the article "Understanding the Role of Different Conductive Polymers in Improving the Nanostructured Sulfur Cathode Performance" by Li et al., published in Nano Letters 2013, 13, 5534-5540, the role of various polymers in the Sulphur electrode has been studied.

The aspects for improvements of Li—S batteries are complex, and the effects from the various components, including improved separator configuration, electrode materials, and electrolytes, as well as varying dimensions, are difficult to separate, which also makes direct comparison between various Li—S battery systems from different experimental designs difficult. Common for all attempts are the ongoing efforts for improvements not only for the capacity but, especially, with respect to improved lifetime. However, in the competitive race for maximum capacity and long lifetime, less attention has been drawn to cost and ease of large scale production. Especially on this part, there is still a severe need for improvements.

DESCRIPTION/SUMMARY OF THE INVENTION

It is therefore an objective of the invention to provide an improvement in the art. Especially, it is an objective to provide improvements with respect to the lifetime of Lithium-Sulphur (Li—S) batteries. Focus in this connection has the prevention or at least reduction of migration of polysulphide intermediates to the Li metal anode in order to minimize capacity loss with repeated cycling. It is also an objective to provide improvements in Li—S batteries with respect to lifetime by production methods that are useful for low-cost large-scale production with a high degree of consistency. These objectives are achieved with Li—S battery cells and with production methods as described in more detail in the following.

The Li—S battery cell comprises a Sulphur-containing cathode, a Lithium-containing anode, a separator in between the cathode and anode with an electrolyte on both sides of the separator filling interspaces between the anode and the cathode. The separator contains electrically conducting carbon and prevents polysulphide intermediates from migrating from the Sulphur-containing cathode to the Lithium anode.

A useful substrate material for the separator is a porous fibrous material in which or onto which the carbon is provided, for example by a coating. For example, the separator comprises a substrate of glass fibres (GF).

It is believed that the porosity of the separator influences the performance. As compared to a Celgard PP porous film, which is used in the above mentioned article by Yao, a fibrous separator with a higher porosity is regarded as superior.

Especially, with respect to glass fiber (GF) membranes, these not only have higher thermal stability and larger ionic conductivity but also possess superior electrochemical performance compared to microporous PP. GF membranes have excellent electrolyte wettability and are promising separator candidates for high-performance Li—S batteries.

A method for producing the glass fiber substrate for the separator is electrospinning By this procedure, the glass fibers can be produced with a diameter of less than one micron and are, therefore, typically called nanofibers. Other methods that can be used to produce glass fiber substrate include, but are not limited to centrifugal spinning and melt blowing.

In the substrate that was used for the separator in experiments, the glass fibres had diameters below 2 microns and mostly had a diameter in the range of 0.1-0.4 microns.

However, for the fibrous substrate of the separator, also other types of nano-fibers are obtainable by electrospinning, centrifugal spinning or melt blowing. Examples include the following. Polyacrylonitrile (PAN), polyvinylidene fluoride (PVDF), polyvinylidene fluoride-co-hexafluoropropylene (PVDF-co-HFP), polyacrylonitrile/polyvinylpyrrolidone (PAN/PVP), polyamide (Nylon), or their blends. Nanopartides, for example, silicon dioxide ($SiO_2$), titanium dioxide ($TiO_2$), or graphene oxide (GO), can be introduced into electrospun nanofibers to form composite membranes to further increase the physical and electrochemical properties of separators.

Besides the abovementioned material types, poly(methyl methacrylate) (PMMA), poly(methyl methacrylate)/poly (ethylene glycol) methyl ether (PMMA/PEGMe), poly(hydroxyethyl acrylate-acrylonitrile) (P(HEA-AN)), poly(m-ethyl methacrylate-acrylonitrile-vinyl acetate) (PMMA-AN-VAC), poly(acrylonitrile-co-butyl acrylate)/poly(vinyl chloride) (PAN-BuA/PVC), polyvinylidene fluoride hexafluoropropylene/poly(methyl methacrylate-co-acrylonitrile-co-Lithium methacrylate) (PVDF-HFP/PMAML), polyvinylidene fluoride hexafluoropropylene/poly(ethylene oxide-co-ethylene carbonate) (PVDF-HEP/PEO-EC), polyvinylidene fluoride-co-hexafluopropylene/poly(vinylacetate) (PVDF-HFP/PVAc), poly(3-decyl thiophene) (P3DT), polytriphenylamine (PTPAn), poly(vinylidene fluoride)-graft-poly(tert-butyl acrylate) electrolytes (PVDF-g-tBA, polyimide/polyacrylonitrile (PI/PAN), poly(vinylidene fluoride-co-chlorotrifluoroethylene) (PVDF-CTFE), are candidates for separator substrates.

For example, the separator is coated with a coating that comprises or consists of a mixture of a polymer and electrically conductive nano-sized carbon particles. Particle sizes are in the range of 10-100 nm.

An advantageous thickness of the coating is at least 5 microns, for example a thickness in the interval of 5-80 microns or 10-80 microns or 15-70 microns or 20-60 microns. Thickness variations for the coating are typically and advantageously small, typically less than 20%, for example less than 10% or even less than 5%.

It has been found that carbon layers with thickness far above 1 micron are advantageous, in contrast to the postulate of Yao et al. in the above-mentioned article, reading "the thickness (tens of microns) and the mass (several miligrams) of these interlayers are rather large, which if not reduced would substantially decrease the specific capacity of the cell"

One reason for the advantage of a larger thickness is believed to be the necessity of a proper carbon barrier against the diffusion of polysulfides. Maximizing the capacity of a battery cell relatively to the total weight of the cell requires a high Sulphur content, however, a high Sulphur content also produces a high amount of polysulfides, and it is understood from the performed experiments that a thickness of at least some microns is necessary to provide a proper barrier. A carbon layer of at least 5 microns appears advantageous, although, in some instances, a layer of at least 2, at least 3, or at least 4 microns may be sufficient.

An advantageous polymer is polyvinylidene difluoride, PVDF. A typical requirement for the polymer is that it should be stable in the battery environment with the electrolyte. A possibility is to use the same type of polymer as in the electrode. Other advantageous polymers for such coatings include polyvinylpyrrolidone (PVP), sodium alginate salt, polyethylene oxide (PEO), carboxymethylcellulose sodium salt (CMC), cyclodextrins, or polyacrylic acid (PAA). Mixtures of these polymers can also be used.

Advantageously, the ratio by weight between the carbon and the polymer in the coating is 7.5:2.5 or lower, for example 7:3 or lower. For example, a lower limit for the ratio is 5:5.

In some embodiments, the carbon in or on the separator, for example in a coating of the separator, is provided as nano-sized carbon black particles, the nano sized carbon particles having a diameter range of 10 nm to 100 nm, for example 20-40 nm. Alternatively, the carbon is provided as nanotubes, particularly multi walled carbon nanotubes, or as graphene. A further alternative is graphene oxide.

Advantageously, the Sulphur content in the cathode is at least 50% by weight, for example at least 60% or more than 60%. In some embodiments, the content is at most 90%, for example at most 80%. A good content interval is between 65% and 75%.

The Sulphur in the cathode is provided in the powder form. For example 60-80 wt %, such as 70 wt %, pure Sulphur is mixed into a polymer to provide a Sulphur cathode. Advantageously, also an electro-conductive additive is incorporated, for example carbon particles. An advantageous concentration is 10-20 wt %, such as 20 wt %. The Sulphur and the electro-conductive additive are combined with a binder polymer, for example in a PVDF binder.

A further possibility for the Sulphur is monodispersed Sulphur nano-particles coated with a polymer, for example polypyrrole, for example as disclosed in the above mentioned article by Yao et al., where the nanoparticles have a diameter of 0.8 microns. However, as polypyrrole requires solvents, there are instances where this is not an optimum solution for mass production. Also, although the improved capacity is remarkable from the experimental results as disclosed in the above-mentioned Yao article, the polypyrrole coated monodispersed Sulphur nanoparticles have in initial experiments been found not to yield consistent results, which makes them less suitable for large scale production with requirements of consistent and repeatable parameters, especially charge capacity.

In some embodiments, the Sulphur loading on the cathode is in the interval of 0.5 to 4 mg/cm2, for example 0.7 to 4 mg/cm2. Examples are intervals of 0.7 to 1.0 mg/cm2, 1 to 2.5 mg/cm2, and 2.5 to 4 mg/cm2. An experimental tested interval was 0.7 to 3.37 mg/cm2.

In some embodiments, the Li—S battery cell comprises a fluid-tight enclosure with a bottom casing and a top casing, for example with an O-ring or other sealant that provides a fluid-tight sealing. Between the casings the cathode, the separator, and the anode are arranged in a sandwich configuration. Further, an elastic spring is arranged inside the enclosure which presses the sandwich configuration together for improving the electrical contact between the Sulphur cathode and the carbon layer of the separator.

Due to the carbon coating on the separator, there is no strict need for carbon on the Sulphur cathode. Accordingly, in some embodiments, the cathode is free from a carbon coating. Alternatively, or in addition, the cathode does not contain carbon nano-particles.

In some embodiments, the carbon-containing separator is combined with a carbon-containing cathode. For example, the carbon is incorporated in the cathode material together with the Sulphur.

Also, there is no need for a further porous carbon sheet provided between the Sulphur cathode and the Lithium anode, especially between the Sulphur cathode and the separator. Instead, the carbon coated separator is an alternative to the carbon-containing cathode, as disclosed in the above-mentioned patent applications US2015/014890 and US2015/05607, as well as disclosed in the above-mentioned article "Sulfur gradient-distributed CNF composite: a self-inhibiting cathode for binder-free Lithium-sulfur batteries", by Fu et al., and an alternative to the carbon interlayer as disclosed in WO2014/028218 by Manthiram et al.

The term 0.2 C is used as an expression of the charging speed, namely 0.2 C=⅕ of the full capacity charging per hour, equivalent to 5 hours charging time for full capacity; correspondingly, 0.1 C, 0.5 C, and 1 C, means 10 hours, 2 hours and 1 hour charging time until full capacity.

All percentages are by weight, for example as indicated by the term "wt %".

SHORT DESCRIPTION OF THE DRAWINGS

Figure 2:
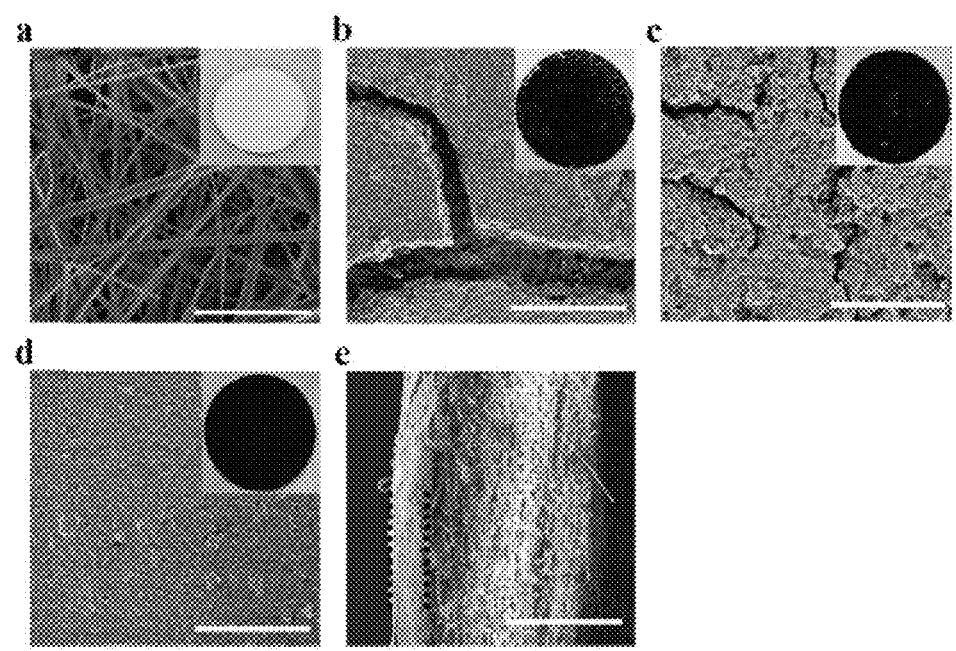
Figure 3:
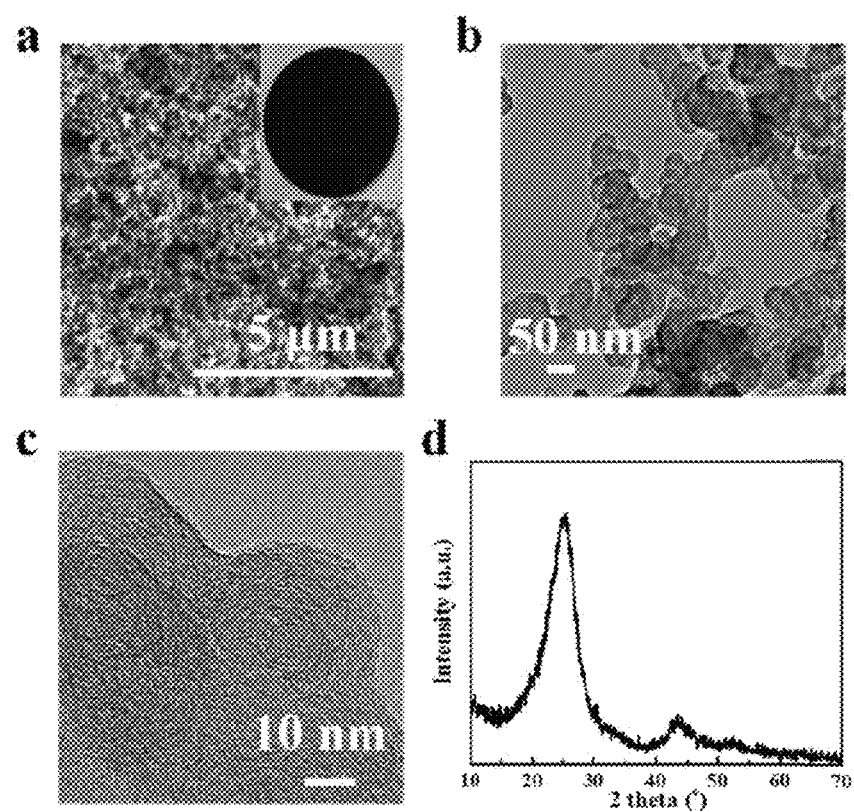
Figure 5:
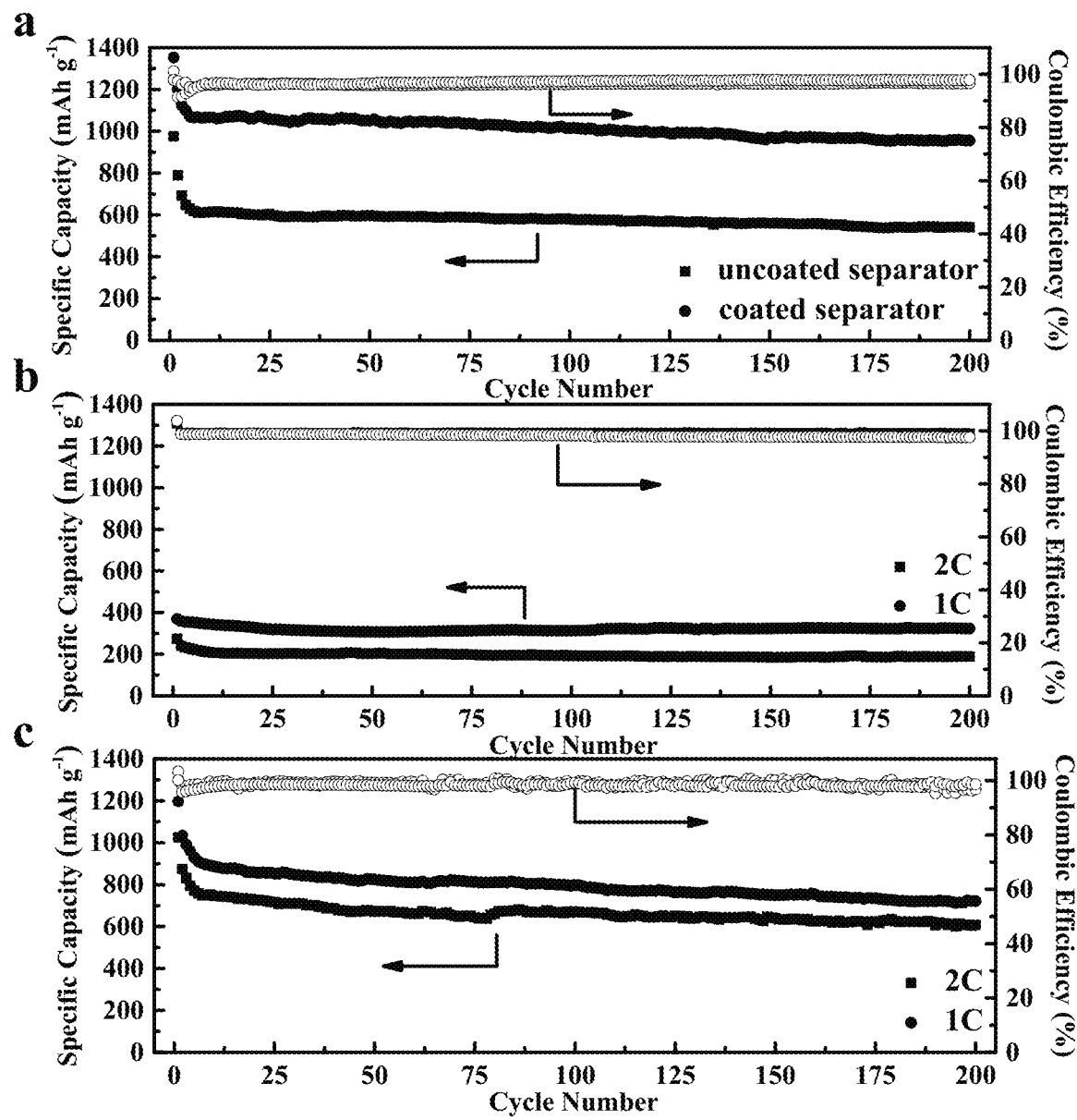
Figure 6:
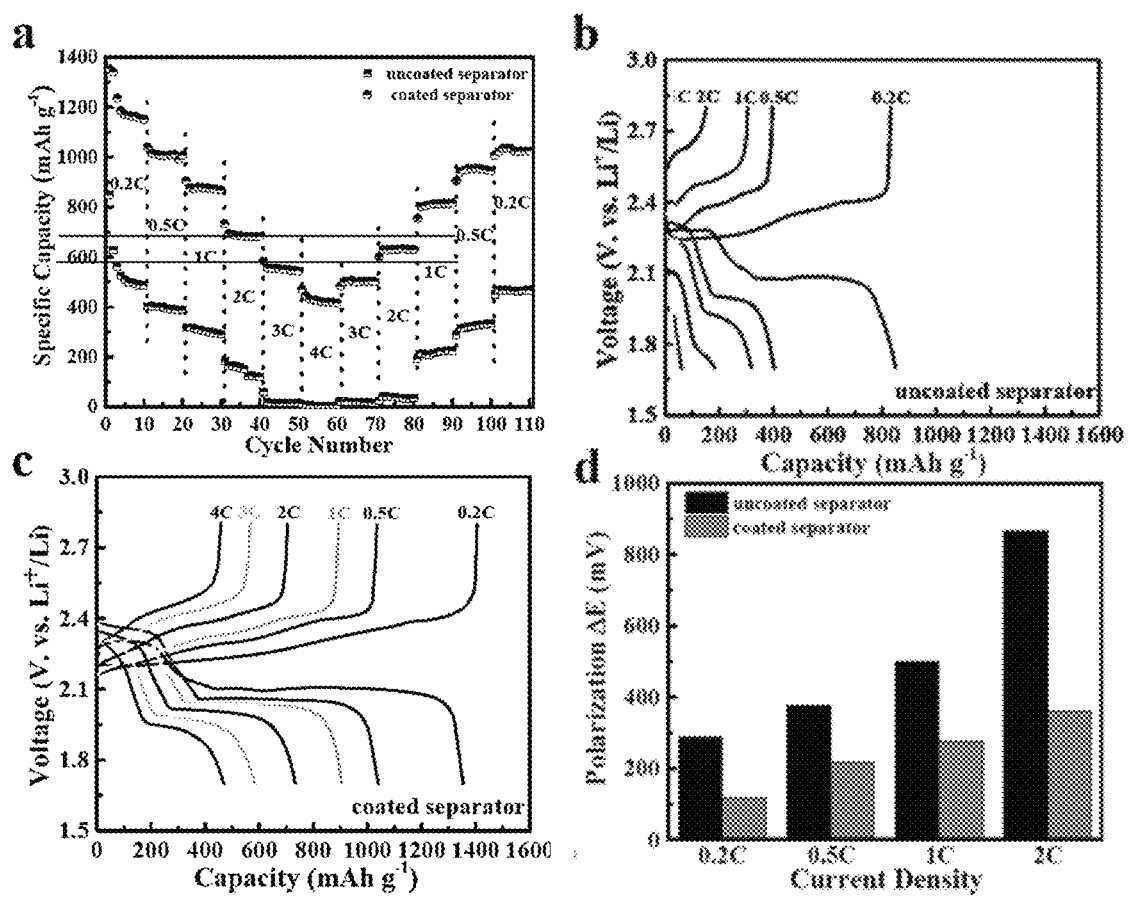
Figure 7:
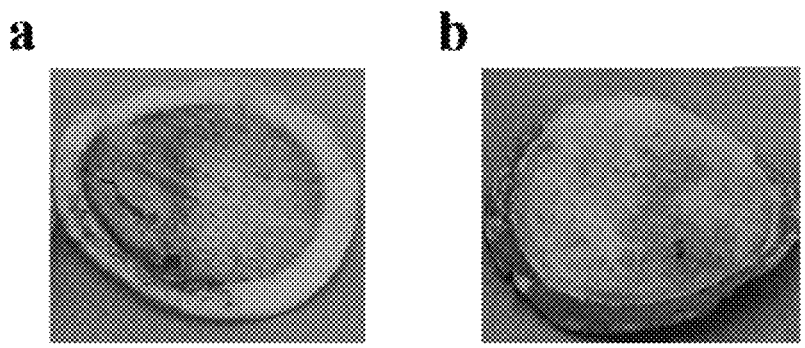
Figure 8:
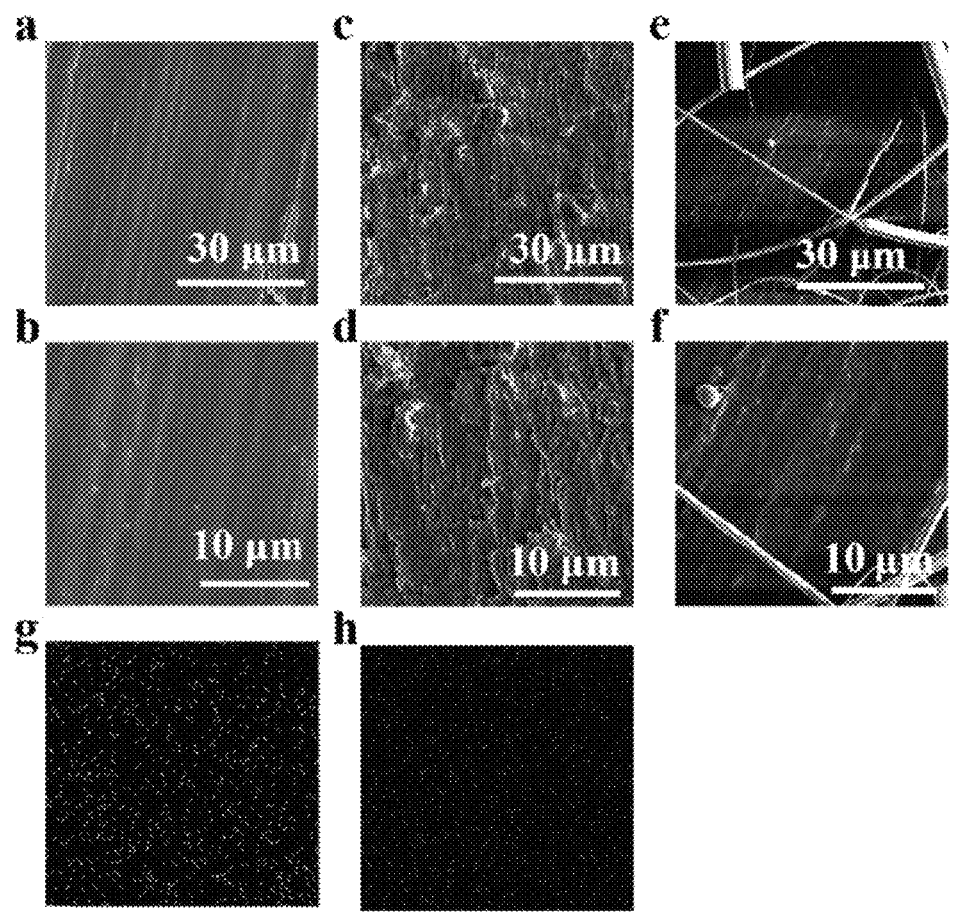
Figure 9:
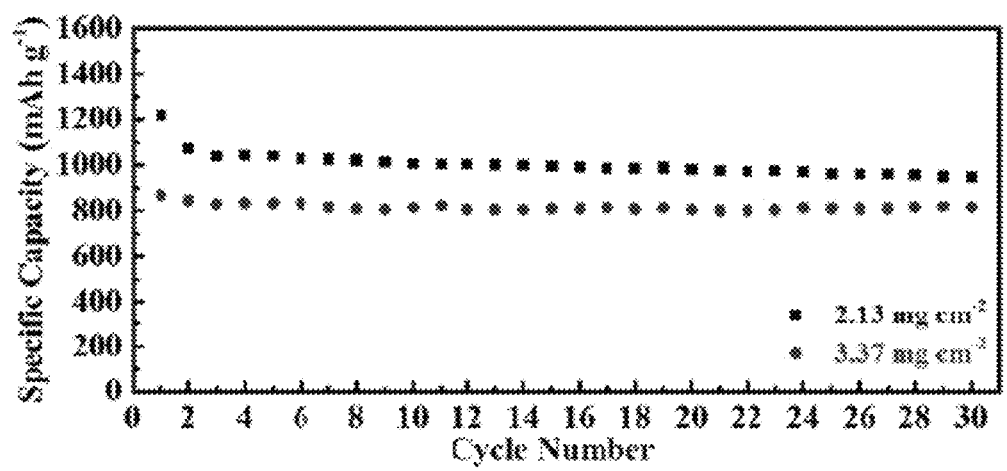

The invention will be explained in more detail with reference to the drawing, where FIG. 1 a) illustrates a schematic configuration of a Li—S cell with carbon coated glass fibre as the separator;
  b) is a photograph of the final battery cell as well as a sketch of the assembly;
FIG. 2 SEM images of
  a) a glass fibre separator in a pristine state (insert is a photograph);
  b), c) and d) glass fibre separators coated with carbon/PVDF mixtures with a ratio between the carbon and the PVDF of 9:1, 8:2, and 7:3, respectively; inserted are photographs of the respective separator (insert is a photograph);
  e) a cross sectional area of a glass fibre coated with carbon/PVDF at a ratio of 7:3; Scale bar is 10 μm (a); 100 μm (b, c, d); 200 μm (e);
FIG. 3 a) SEM image of the surface of the carbon coated glass fibre (insert is a photograph);
  b) low resolution TEM image of carbon particles;
  c) high resolution of carbon particles;
  d) XRD spectrum of carbon particles;
FIG. 4 a) impedance spectra of Li—S cells with uncoated glass fibre and carbon coated glass fibre before cycling;
  b) cyclic valtammogram scans of a Li—S cell with uncoated separator;
  c) cyclic voltammogram scans of a Li—S cell with a carbon coated separator;
  d) discharge/charge profiles in the first cycle of the Li—S cells with uncoated separator at a charging current density of 0.2 C;
  e) discharge/charge profiles in the first cycle of the Li—S cells with a carbon coated separator at a charging current density of 0.2 C;
  f) model scheme of polysulphide diffusion in Li—S cells with uncoated separator (left) and coated separator (right);
FIG. 5 cycling performance of Li—S cells
  a) with uncoated separator and carbon coated separator at a charging rate of 0.2 C;
  b) with uncoated separator at high charging rates of 1 C and 2 C;
  c) with carbon coated separator at high charging rates of 1 C and 2 C;
FIG. 6 a) rate cyclability of Li—S cells with uncoated separator in comparison with a carbon coated separator from 0.2 C to 4 C;
  b) discharge/charge profiles of Li—S cells with an uncoated separator for different charging rates of 0.2 C to 4 C;
  c) discharge/charge profiles of Li—S cells with a carbon coated separator for different charging rates of 0.2 C to 4 C;
  d) comparison of the potential difference of Li—S cells with uncoated separator and Li—S cells with carbon coated separator;
FIG. 7 a) and b) photographs of the Lithium electrode side of the separator surface after 100 cycles at a charge rate of 1C for a) an uncoated separator and b) a carbon coated separator;
FIGS. 8 a) and b) SEM surface images two different magnifications of a pristine Li metallic plate before cycling;
  c) and d) SEM surface images two different magnifications of a Li metal anode from a Li—S cell with uncoated separator after 100 charging cycles;
  e) and f) SEM surface images two different magnifications of a Li metal anode from a Li—S cell with a carbon coated separator after 100 charging cycles;
  g) and h) S-elemental mapping of the Li metal anode from the Li—S cell with uncoated and carbon coated separator, respectively;
FIG. 9 cycling performance of high Sulphur loading of 2.13 and 3.37 mg/cm$^2$ in cells with a carbon coated separator at a charging rate of 0.2 C;
FIG. 10 reproduced FIG. 7a from the article "Improved Lithium-sulfur batteries with a conductive coating on the separator to prevent the accumulation of inactive S-related species at the cathode-separator interface", by Yao et al., published in August 2014 by The Royal Society of Chemistry in Energy & Environmental Science (www.rsc.org/ees-DOI: 10.1039/c4ee01377h); horizontal lines have been added for illustration. This article is accessible on the Internet at FIGS. 11 a) and b) reproduced figures S2 and S3 from a supplementary to the article by Yao et al. as mentioned for FIG. 10, publicly accessible on the Internet at FIG. 12 a graph comparing the result of the present work with some prior art results.

DETAILED DESCRIPTION/PREFERRED EMBODIMENT

FIG. 1a illustrates the schematic configuration of a Li—S cell with carbon-coated separator. Offset is taken in a conventional Li—S battery design with a Sulphur cathode and a Lithium anode and a separator in between as well as an electrolyte (not shown). The separator comprises a carbon coating on its surface for preventing dissolved $Li_2S_x$ ($4 \leq x \leq 8$) in the electrolyte to reach the anode. This follows the approach as disclosed in the aforementioned article by Yao et al. The cathode comprises a Sulphur surface towards the separator, wherein the Sulphur surface is provided without a carbon coating FIG. 1b contains a photograph of the battery cell that was constructed in experiments for which results are presented below. In the assembly sketch, it is seen that the battery cell comprises an enclosure with a bottom and top casing between which the battery components are arranged in addition to a spring that presses the Sulphur electrode, the separator and the Lithium foil together for minimizing space. It also improves the electrical contact between the Sulphur cathode and the carbon layer of the separator.

However, as explained in more detail in the following in comparison with the system in the article by Yao et al., various differences exist, including the carbon layer thickness 60 microns versus 1 micron in the Yao article;
the carbon loading in the carbon layer was 0.6 mg/cm$^2$
the ratio between carbon and polymer of 7:3 in the carbon coating layer as compared to the ratio of 9:1 in the Yao article;
the separator material of glass fiber versus the PP Celgard membrane material in the Yao article;
the carbon coated fibrous separator abutted the Sulphur cathode with the coating side towards the cathode.

Very positive results have been obtained with a glass fiber (GF) separator. FIG. 2a shows an SEM image of such a separator. A photograph of the separator is shown as an insert in FIG. 2a.

Good results for a carbon coating on the separator have been obtained by a mixture of conductive carbon and polyvinylidene fluoride, also called polyvinylidine difluoride (PVDF). A carbon slurry was prepared by mixing 70 wt % carbon black nano-particles of the commercial type Super P (TIMCAL, Graphite & Carbon Ltd., C-65) and with 30 wt % polyvinylidene fluoride (PVDF) in N-methyl-2-pyrrolidone (NMP, Sigma-Aldrich) solvent. The carbon coating was applied to the separator glass fiber substrate by scraping it onto the substrate with a doctor blade. The carbon-coated separator was dried in a vacuum oven at 60° C. for 12 h.

Especially, the production method has been made with simple and low cost means with the aim of easy scalability to large scale production at low cost and ready availability of the material. However, as an alternative to the doctor blade method, a spray method or dip padding for the carbon coating on the fibrous separator is applicable as well.

The glass fiber substrate (Whatman, GF/A 1820 042-borosilicate fibers), carbon particles of the commercial type Super P (TIMCAL, Graphite & Carbon Ltd., C-65), and polyvinylidene fluoride (Solef® PVDF-5130, Solvay) were used as received. The PVDF was diluted with N-methyl-2-pyrrolidone (NMP, 99%, Sigma-Aldrich). The carbon particles were mixed into the PVDF by using mortar and pestle. Subsequently, the coating was scraped by a doctor blade onto the glass fiber substrate. The thickness of the coating was controlled to a precision of one micron by the doctor blade.

The Sulphur cathode consisted of 70% Sulphur, in particular form, the particle size being in the interval of 5-50 microns. The Sulphur electrodes were prepared by casting a slurry containing 70 wt % pure Sulphur (Sigma-Aldrich), 20 wt % conductive carbon nanoparticles of the type Super P (TIMCAL, Graphite & Carbon Ltd., C-65), and 10 wt % PVDF binder in NMP (Sigma-Aldrich) on a carbon-coated aluminum foil, followed by drying in a vacuum oven at 60° C. for 12 h.

The areal loading of Sulphur for the as-prepared electrodes ranged from 0.70 to 3.37 mg cm$^{-2}$. Particularly, Sulphur loadings were 0.7-1.0 mg/cm$^2$ in a first series of experiments and 2.13 and 3.37 mg/cm$^2$ in further experiments.

To test the electrochemical properties, 2032-type coin-shaped cells were assembled using the produced Sulphur electrodes, and either a pristine glass fiber (PGF) separator or a carbon coated glass fiber (CGF) separator, as well as Li metal foil (Sigma-Aldrich) as the counter electrode.

The electrolyte was prepared by dissolving 1 M bis(trifluoromethane)sulfonamide Lithium (LiTFSI, Sigma-Aldrich) and 0.1 M Lithium nitrite (99.99% trace metals basis, Sigma-Aldrich) in a mixture of 1,3-dioxolane (DOL, Sigma-Aldrich) and 1,2-dimethoxyethane (DME, Sigma-Aldrich) (1:1 by volume). The cell assembly process was done in an argon-filled glove box.

The separator was placed with its carbon coated side abutting the cathode surface, where the electrolyte filled the pores of the separator and provided proper electrical contact between the cathode and the separator. The anode was abutting the uncoated side of the separator. The diameters of the anode/cathode/separator were 0.5 inch (12.8 mm), 0.5 inch (12.8 mm) and 0.625 inch (15.9 mm), respectively. The sandwich layer of cathode, separator and anode, including the electrolyte had a thickness of 0.5 mm. Electrical contacts were provided on the anode by the Lithium itself and on the cathode by the carbon/Sulphur composite and were attached to the anode by electrolyte. The casing of the cell was stainless steel and the cases electrically insulated from each other by an O-ring.

Figure 1B:
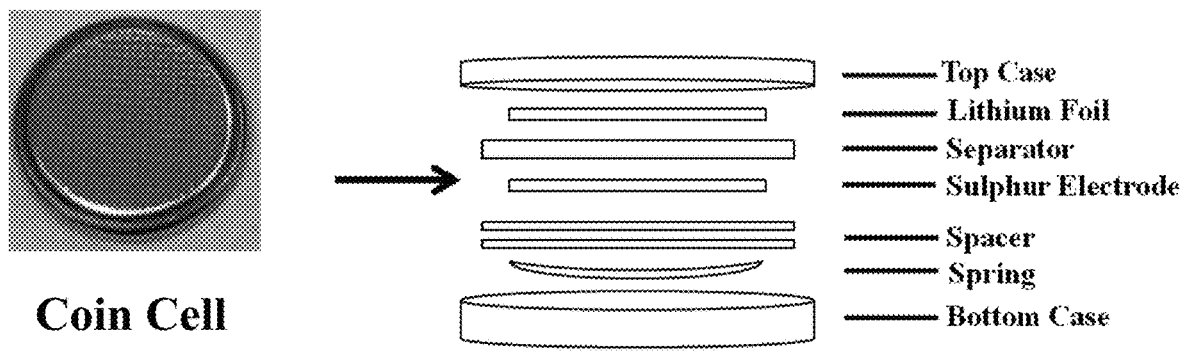

A picture of the final cell as well as a principle sketch is shown in FIG. 1b. The principle sketch illustrates a top case and the bottom case (the O-ring is not shown in the right principle sketch) between a spring and a spacer assembly, which are arranged for pressing the chemically acting battery elements together. The battery elements are, as illustrated in FIG. 1b, a Lithium foil and a Sulphur electrode separated by the carbon coated separator. Also contained in the battery is the liquid electrolyte, which is not shown in FIG. 1b.

FIGS. 2b, 2c and 2d show scanning electron microscope (SEM) images of three glass fiber separators coated with carbon/PVDF mixtures of 9:1, 8:2, and 7:3, respectively. Inserted in each image is a photograph of the separator. As can be verified by FIG. 2d in comparison with FIG. 2b and FIG. 2c, the ratio coating with a ratio of 7:3 showed the best coating quality. Although, it is believed that the coating with a ratio of 9:1 and 8:2 may work in an initial phase, a decrease in the quality can be expected with a correspondingly shortened lifetime. For this reason, a ratio of at most 7:3, for example also 6:4 and 5:5, is better than mixtures where the carbon content is too high. The transition between the cracking phase as illustrated in FIG. 2c and the smooth phase in FIG. 2c is reasonable to expect at around 7.5:2.5. Thus, a limit for the carbon content in the polymeric binder, is 75% maximum, while it has been proven that at 70% carbon and 30% PFDF binder, there are no cracks found in the coating.

FIG. 2e shows an SEM image of a cross sectional area of a glass fiber coated with carbon/PVDF at a ratio of 7:3. In more detail, FIG. 2e shows a relatively uniform carbon coating with a thickness of 60 μm on the separator. The carbon coating can be seen in the left part of the photo, and the substrate is in the right part of the photo. The sample was prepared by cutting a large piece of carbon-coated separator using scissors.

In the experiments, a carbon loading of 0.6 mg/cm$^2$ was used for the coating. It is believed that a good interval for carbon loading in terms of mg/cm$^2$ is in the interval of 0.5-1 when the Sulphur content and carbon loading in the cathode are 50%-80 wt % and 0.7-5 mg/cm$^2$, respectively.

It is important to note that the coating thickness may affect the final electrochemical performance of the Li—S cell. Although, the coating thickness can be easily controlled by applying a certain amount of coating material to the substrate, a coating that is too thin is fragile and does is not believed to ensure long term functionality. For example, the very thin coating of 1 micron as disclosed in the above-mentioned article by Yao is not regarded as advantageous for a long lifetime. Instead, a thickness of more than 2 microns, especially more than 5 microns, for example more than 10 microns, is feasible. In the experiments in FIG. 2e, a coating thickness of 60 microns was used, and such thickness has proven good performance and long term stability even with high Sulphur content (70%) and high carbon loading (up to 3.37 mg/cm$^2$). This gives an indication of a good coating thickness, although it is believed that a coating thickness in the broader interval of 5-80 or 10-80 microns, for example in the interval of 15-70 microns, could also be used. It is believed that a thickness above 5 microns is best. As illustrated in FIG. 2e, the carbon coating had a homogeneous thickness.

FIG. 3a shows scanning electron micrographs of the conductive carbon coating used in this example. It is seen that the nano-sized carbon particles were uniformly dispersed on the surface of the glass fiber. This reduces the electrical resistance by providing sufficient surface contact with the Sulphur cathode. The highly porous coating structure is beneficial for electrolyte penetration during cycling. The transmission electron microscope (TEM) was used to evaluate the size of the carbon particles in the coating. The particle size ranged from 30 to 50 nm, as shown in FIG. 3b. The crystal nature of the carbon particles was identified by high-resolution TEM, reproduced in FIG. 3c, which was in good agreement with its X-ray diffraction (XRD) pattern, as shown in FIG. 3d. The crystallized carbon structure generally provides good electrical conductivity, which is also beneficial for improving the electrochemical performance of the battery cell.

Figure 4A:
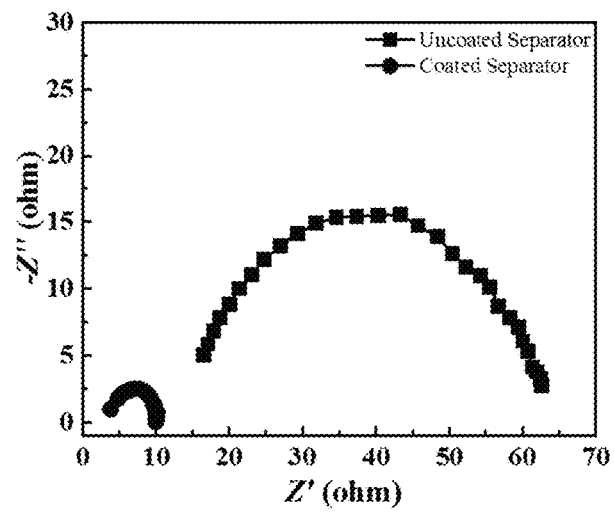

As illustrated in FIG. 4a, the diameter of the depressed semicircle, regarded as the charge resistance of the cell, was 46Ω for the uncoated glass fiber separator and only 6.2Ω for the separator with the conductive carbon coating. This should be compared with FIG. 11a, which is a reproduction of figure S2 from the supplementary article by Yao et al., as mentioned in the introduction, which is related to the same battery cell for which the measurements of FIG. 10 are made. It is seen that the charge resistance dropped from 53Ω to 34Ω by changing from the uncoated separator to the Super P coated separator in the battery cell of Yao et al. This result of 34Ω is much larger than the 6.2Ω as measured in the battery cell of the invention. Seeing that both experiments use Super P carbon and PVDF in the coating, the effect can be attributed mainly to the substrate material of the separator.

In order to investigate the influence of the substrate configuration, measurements were performed for parametric comparison of the PP membrane separator of Yao et al., where the substrate is a 35 microns thick stretched polypropylene foil, namely Celgard PP, and the substrate in the present experiments, which was a 260 microns thick fibrous substrate consisting of non-woven electro-spun glass nanofibers. A profound difference was measured in the porosity between these two substrates, which is 41% in the Celgard PP and 66% in the glass fiber substrate, as found by conducting n-butyl alcohol uptake tests. The higher porosity leads to higher electrolyte intake and consequently greater ionic conductivity when placed in an electrolyte, facilitating rapid ionic transportation. As revealed in measurements, the electrolyte uptake in the Celgard PP of Yao et al. was found to 152%, which is compared to 360% in the glass fiber substrate. The measurements were performed by soaking weighed separators in liquid electrolyte of 1 M LiTFSI and 0.1 M LiNO$_3$ in a mixture of DOL and DME (1:1 by volume) for 2 hours at room temperature. By electrochemical impedance spectroscopy (EIS), the ionic conductivity of the Celgard PP was determined as 0.60 mS/cm, whereas it was 3.83 mS/cm for the glass fiber substrate.

Figure 4B:
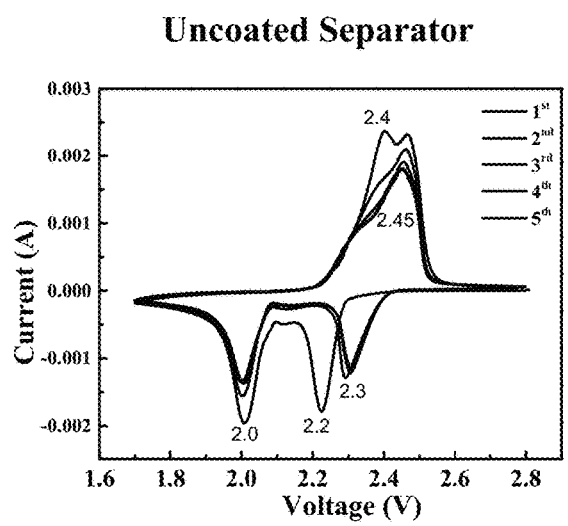
Figure 4C:
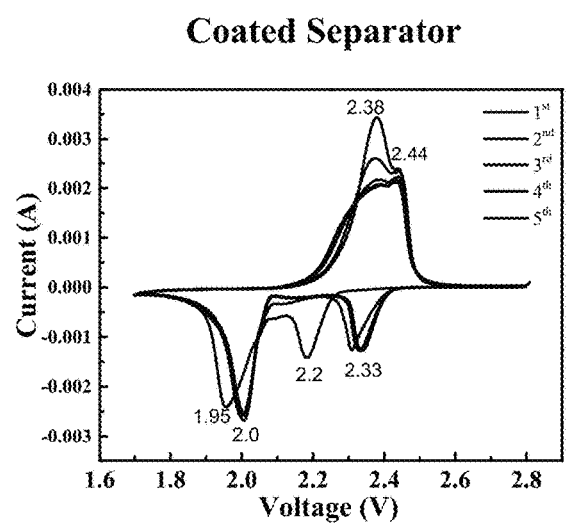

The cells with the uncoated separator and the cells with the coated separator showed mutually similar cyclic voltammetry curves, as is seen by the voltammogram scan curves of FIGS. 4b and 4c in comparison. During discharge, the cathodic peak at ~2.3 V represents the transformation of Sulphur into soluble long-chain polysulphides (Li$_2$S$_x$, 4<x≤8) and the cathodic peak at ~2.0 V represents the conversion of long-chain polysulphides to Li$_2$S$_2$/Li$_2$S.

Figure 4D:
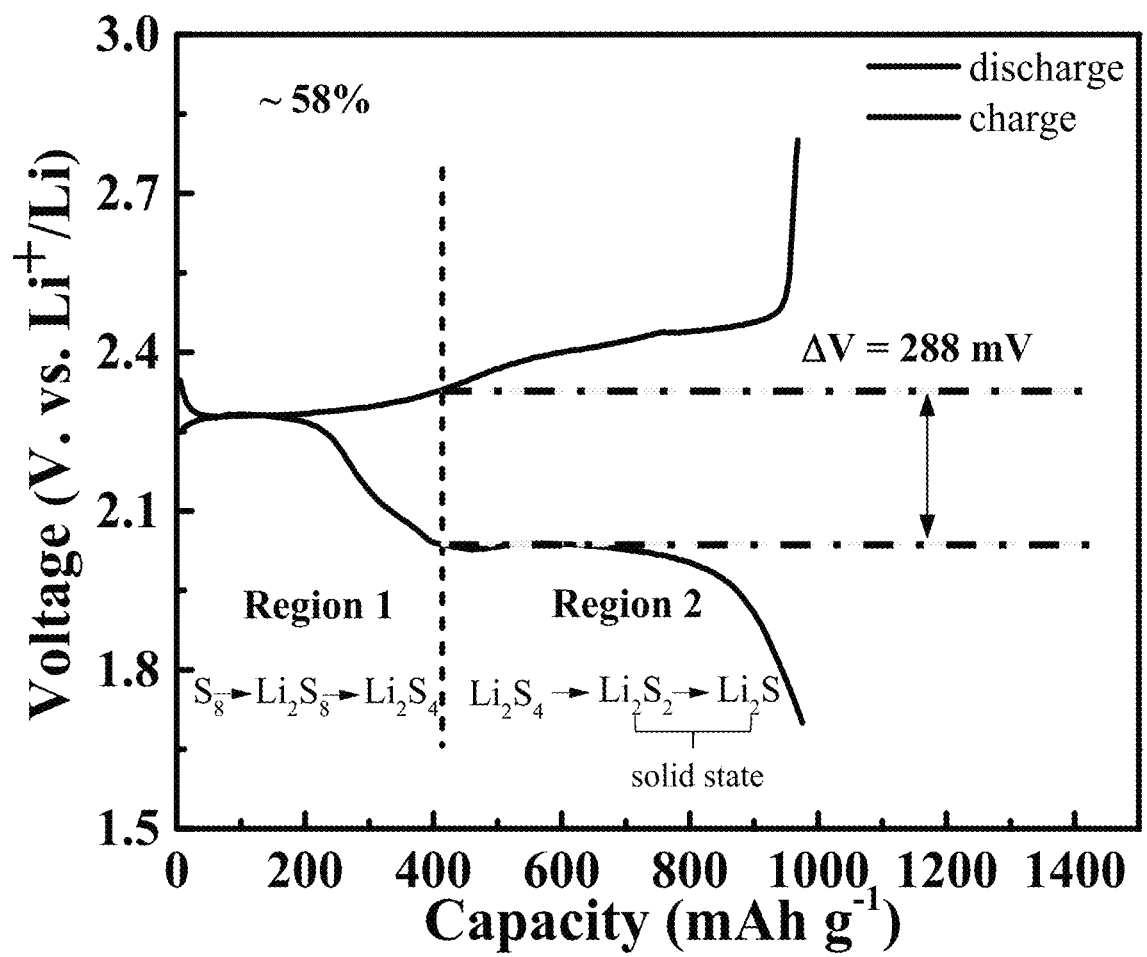
Figure 4E:
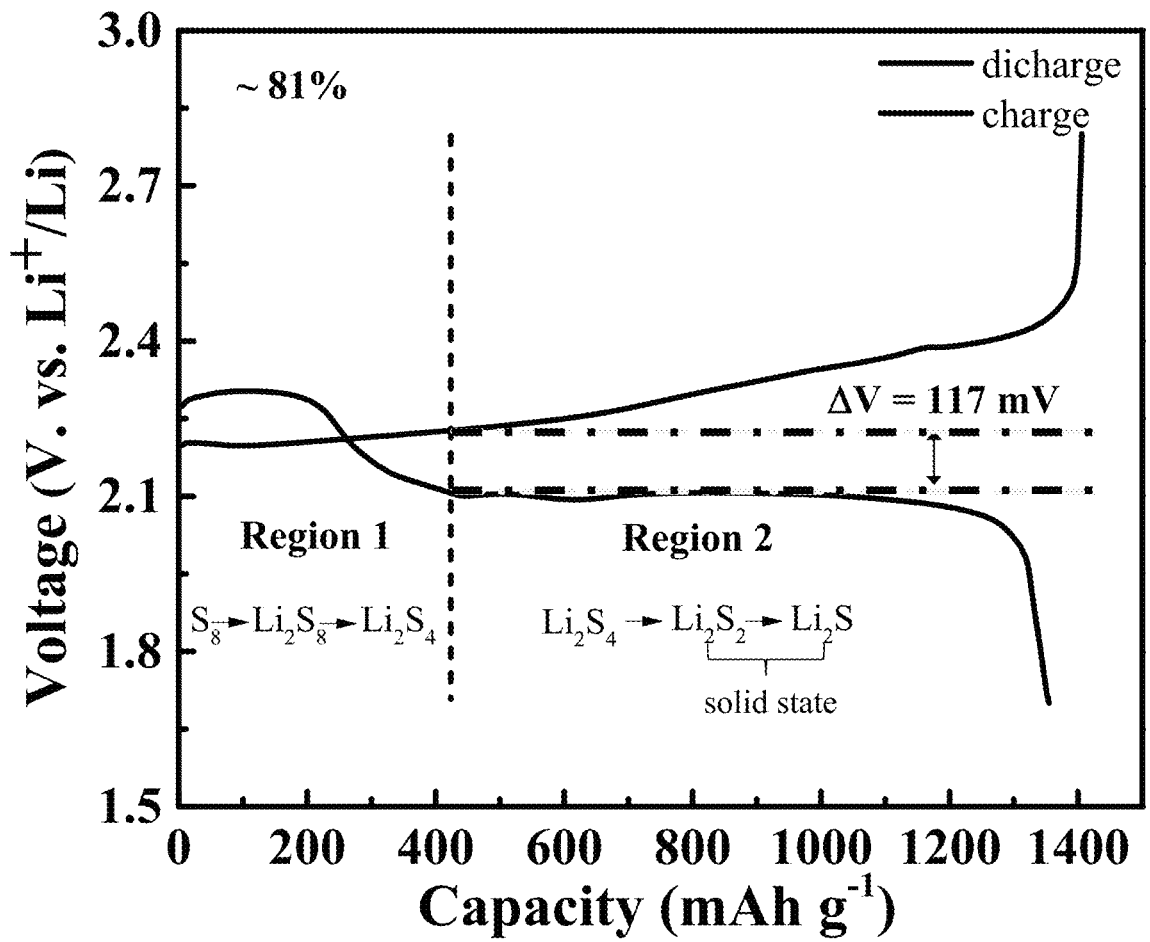

However, the cell with a carbon coated separator displayed higher utilization of active material and lower polarization potential, which is illustrated in FIGS. 4d and 4e, showing the discharge/charge profiles in the first cycle of the Li—S cells with uncoated separator and carbon coated separator at a charging current density of 0.2 C. For both cells, the capacity of Region 1 is around 400 mAh/g, which is comparable to the theoretical value (418 mAh/g), indicating that the Sulphur have been fully converted to Li$_2$S$_4$. The increased capacity by the conductive carbon coating is mainly the result of extended Region 2

Figure 4F:
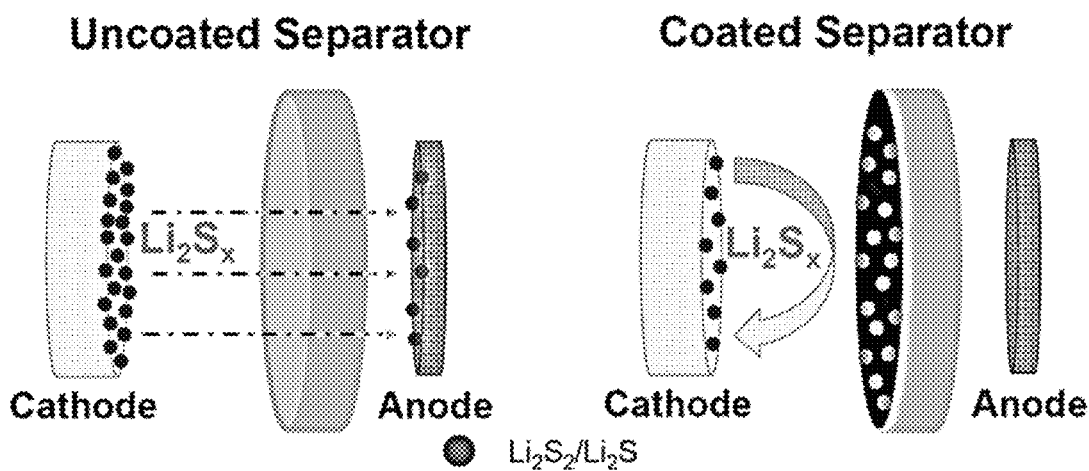

This is believed to be due to the conductive carbon coating acting as a second current collector, causing a tendency of the solid Lithium sulphides being deposited on the surface of the coated separator instead of being formed on the Lithium anode surface, which is beneficial for enhancing the utilization of active material. A comparative illustration thereof is shown in FIG. 4f.

FIG. 5a is a graph illustrating the cycling performance of Li—S cells with an uncoated separator (lower curve) and carbon coated separator (upper curve) at a charging rate of 0.2 C. The improved cycling performance can be ascribed to the conductive carbon coating on the separator, which not only enhances the electrical conductivity of the electrode, but also helps trap soluble polysulphide intermediates, avoiding the shuttle effect during the prolonged charge/discharge cycles.

All capacity values as presented are calculated based on the Sulphur mass, which is customary in the field and makes a direct comparison with capacity results from prior art publications possible.

The initial discharge capacity (with Sulphur utilization in parentheses) increased from 976 to 1352 mAh/g at 0.2 C after changing the uncoated separator to a carbon coated separator, see the left starting points of the measurements in FIG. 5a. This corresponds to a Sulphur utilization of 58% and 81% respectively. These numbers are derived from the following expression:

Sulphur utilization %=specific capacity/theoretical capacity(1675mAh/g)×100%

The carbon coating was of the Super P type C-65 (Timcal Graphite & Carbon Ltd.), which is directly comparable to the Super P coating in the above mentioned article "Improved Lithium-sulfur batteries with a conductive coating on the separator to prevent the accumulation of inactive S-related species at the cathode-separator interface", by Yao et al., published in August 2014 by The Royal Society of Chemistry in Energy & Environmental Science (www.rsc.org/ees-DOI: 10.1039/c4ee01377h). For comparison of the results presented in FIG. 5a of the drawings, the curves as shown in FIG. 7a of the above-mentioned article by Yao apply. This curve by Yao is reproduced in FIG. 10, where horizontal lines have been added for sake of illustration. It is seen in FIG. 5a that the capacity was 980 mAh/g after 150 cycles and 960 mAh/g after 200 cycles. When comparing to the above-mentioned article of Yao, the comparable capacity for 0.2 C=C/5 is found in Yao's FIG. 7a, which decreases to 530 mAh/g for the Super P coated separator.

It must be stressed that the curves in FIG. 5a as well as the curve presented by Yao et al., reproduced in FIGS. 10 and 11, are normalized only to the Sulphur content, as this is customary in the art. Due to the Sulphur content in Yao et al being 60% of the weight of the cathode and in the experiment being 70%, the curves in FIG. 5a in terms of total weight of the cathode are actually higher by a factor of 70/60=1.17, making the comparison with the results of Yao et al even more favourable. In other words, for practical purposes, where the capacity is calculated for the entire battery cell, the results for the capacity in the present work are comparatively 17% higher than the curves as illustrated in FIG. 5, FIG. 6 and FIG. 9. In the above-mentioned article by Yao et al., a 70% Sulphur loading is presented in FIG. 4h of this article, however, the result after 100 cycles is less than 600 mAh/g and thus lower than for the 60% loading, which also favors the experimental evidence presented here over the prior art.

Even for the special carbon type of Ketjen in FIG. 10, the capacity in the experiments by Yao et al. was only 780 mAh/g as compared to the value of 980 mAh/g in the present experiment as illustrated in FIG. 5a.

In relation to Ketjen carbon, it should be emphasized that it is expected that the performance of the battery cell as presented herein is also improved. This is due to the higher surface area of Ketjen carbon than that of Super P carbon, which has as a consequence that higher conductivity is achieved with lower loading quantity.

It is believed some influence on the better performance can be attributed to the carbon-to-PVDF ratio of 7:3 because this results in prevention of cracks in the coating. On the other hand, the influence of the combination of the substantial layer thickness and the 7:3 ratio cannot be excluded, as the tendency to form cracks may increase with the thickness of the layer. Thus, increasing the layer thickness may require increase of the relative amount of PVDF in the coating. This has not yet been fully verified experimentally, but is a reasonable assumption.

The influence of the glass fiber separator material on the better performance as compared to the Celgard PP material used by Yao et al. is believed to be due to the highly porous glass fiber separator having an ability of higher intake of soluble polysulphide intermediates and slowing down their rapid diffusion to the Li anode side, which does not only improve the utilization of active material, but helps protect the Li anode surface as well.

The improved performance 980 mAh/g as compared to 520 mAh/g of Yao et al. is substantial (88% improvement); and it is remarkable (36% improvement) when comparing to the result by Yao et al. of 780 mAh/g for the Ketjen carbon coated separator. In connection with this result, it is important to notice that the production method in the experiments was simple and at low cost, targeted towards easy scalability for large scale production, as already explained in more detail above.

The high rates were also investigated for both cells. With reference to FIG. 5b for an uncoated separator and 5c with a carbon coated separator, a current density increase to 1 C and 2 C caused the cell with the coated separator to deliver reversible capacities of 721 and 607 mAh/g at the 200th cycle (FIG. 5c), with high Coulombic efficiencies of 98.6% and 96.7%, respectively, whereas the reversible capacities for the cell with uncoated separator were only and 323 and 189 mAh/g after 200 cycles at 1 C and 2 C (FIG. 5b).

Rate capability is one of the critical parameters for batteries that limit their practical applications as it directly relates to useful charging times and lifetime. With reference to FIG. 6a, the rate capability of the Li—S cells with uncoated separator and coated separator was evaluated by increasing the discharge/charge current density stepwise from 0.2 C to 4 C every 10 cycles. As the current density increased, the capacity of the cell with the coated separator decreased slowly from the reversible capacity of 1151 mAh/g at 0.2 C to 1008, 869, 683, 544 and 417 mAh/g at 0.5 C, 1 C, 2 C, 3 C, and 4 C, respectively. In contrast, the cathode assembled with uncoated separator exhibited not only much lower capacity at the same discharge rate but also inferior capacity retention ratio of 0.8% (from 487 mAh/g at 0.2 C to 4 mAh/g at 4 C). The data of FIG. 6a for the coated separator are to be compared to the data of Yao et al. in FIG. 11b. It is seen that for the charging speed of 1 C, the capacity by Yao et al. in FIG. 11b is around 340 mAh/g, whereas it is in the order of 650 mAh/g for the data from the present experiment as illustrated in FIG. 6a, which is almost twice as high.

Figure 12:
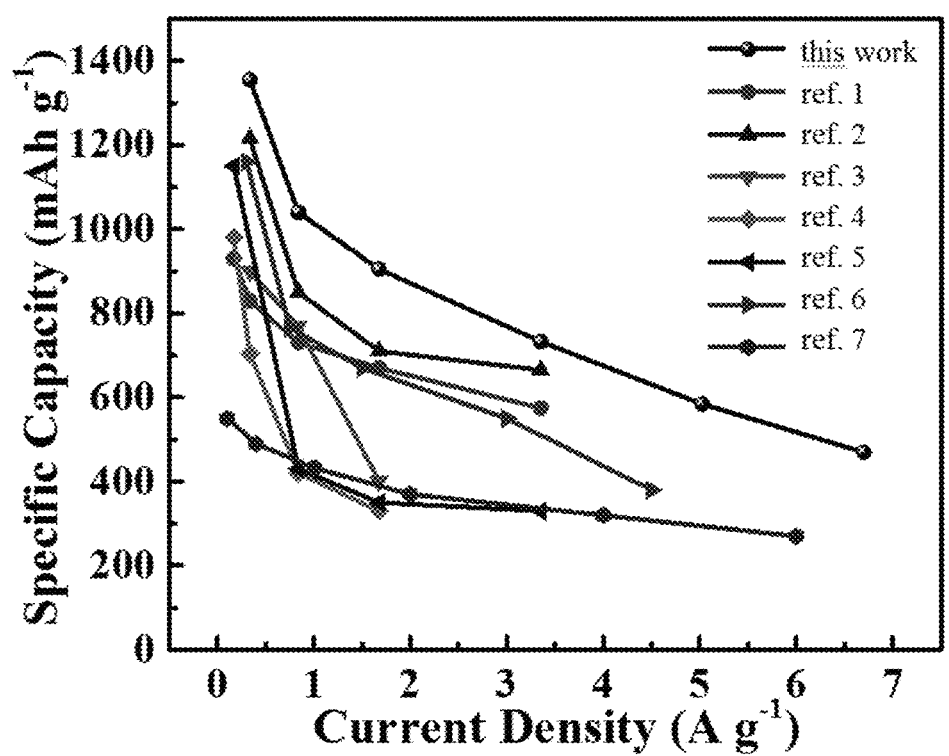

A general comparison of the rate capabilities is illustrated in FIG. 12, which compares to other references, when the capacity is a function of the charging rate normalized to the weight. The references ref.1-ref.7 are as follows, where ref.4 is the article by Yao et al., which has been discussed in more detail above:

1. Huang, J.-Q., et al. Aligned sulfur-coated carbon nanotubes with a polyethylene glycol barrier at one end for use as high efficiency sulfur cathode. *Carbon* 58, 99-106 (2013).

2. Seh, Z. W., et al. Sulphur-TiO2 yolk shell nanoarchitecture with internal void space for long-cycle Lithium-Sulphur batteries. *Nat. Commun.* 4, 1331 (2013).
3. Zhou, G., et al. A flexible sulfur-graphene-polypropylene separator integrated electrode for advanced Li—S batteries. *Adv. Mater.* 27, 641-647 (2015).
4. Yao, H., et al. Improved Lithium-sulfur batteries with a conductive coating on the separator to prevent the accumulation of inactive S-related species at the cathode-separator interface. *Energy Environ. Sci.* 7, 3381-3390 (2014).
5. Lu, S., Cheng, Y., Wu, X., and Liu, J. Significantly improved long-cycle stability in high-rate Li—S batteries enabled by coaxial graphene wrapping over sulfur-coated carbon nanofibers. *Nano Lett.* 13, 2485-2489 (2013).
6. Zhou, G., et al. Fibrous hybrid of graphene and sulfur nanocrystals for high-performance Lithium-sulfur batteries. *ACS Nano* 7, 5367-5375 (2013).
7. Zheng, S., et al. Copper-stabilized sulfur-microporous carbon cathodes for Li—S batteries. *Adv. Func. Mater.* 24, 4156-4163 (2014).

The discharge/charge plateaus at high current rates obviously shifted or even disappeared in the cell with uncoated separator, which indicated high polarization and slow redox reaction kinetics with inferior reversibility, as illustrated in FIG. 6b. In comparison, all discharge/charge curves of the cell with coated separator showed highly reversible capacities with two feature plateaus, as illustrated in FIG. 6c. As can be seen in FIG. 6d, the Li—S cell with coated separator had significantly lower polarization potential than the cell with uncoated separator. The polarization, $\Delta E$, was only 359 mV at 2 C for the cell with coated separator, which was 507 mV lower than that with uncoated separator (866 mV).

To understand the function the carbon coating, photographic images of the Li anode side of the separator surface of both cells were taken after 100 cycles at a current density of 1 C. As seen in FIG. 7a, the yellowish color on the surface of the uncoated separator indicates that polysulphides diffused through the separator and reacted the Lithium anode during cycling, leading to shuttling reaction and reduced active material utilization. However, as seen in FIG. 7b, the surface of the carbon coated separator remained relatively clean and free of yellowish color, which means the polysulphide migration was well controlled by the conductive carbon coating.

FIGS. 8a and 8b shows SEM surface images two different magnifications of a pristine Li metallic plate before cycling. FIGS. 8c and 8d shows SEM surface images two different magnifications of a Li metal anode from a Li—S cell with uncoated separator after 100 charging cycles. FIGS. 8e and 8f SEM show surface images at two different magnifications of a Li metal anode from a Li—S cell with a carbon coated separator after 100 charging cycles. FIGS. 8g and 8h shows S-elemental mapping of the Li metal anode from the Li—S cell with uncoated and carbon coated separator, respectively.

In addition, when the uncoated separator was used, obvious corrosion damage could be observed on the Lithium anode surface with some cracks and the deposition of Sulphur-containing chemicals, such as $Li_2S_2$ and $Li_2S$, which was due to the side reactions between soluble Lithium polysulphides and metallic Lithium during cycling. This is illustrated in the SEM images in FIGS. 8c and 8d at two different magnifications of a Li metal anode from a Li—S cell with uncoated separator after 100 charging cycles. The surface damage of the anode is apparent when comparing to the SEM surface images in FIGS. 8a and 8b at two different magnifications of a pristine Li metallic plate before cycling.

In contrast to the uncoated separator, a relatively smooth, much less damaged surface was found on the Lithium anode after cycling with a coated separator, which is illustrated in FIGS. 8e and 8f, showing SEM surface images at two different magnifications of a corresponding Li metal anode with a carbon coated separator after 100 charging cycles. The improvement in Lithium surface morphology is in good agreement with the S-mapping analysis by Energy Dispersive Spectroscopy (EDS), which is shown in FIGS. 8g and 8h.

The Sulphur loading used in the above example was 0.7-1.0 $mg/cm^2$. However, also investigated was the cycling performance of electrodes with higher Sulphur loadings of 2.13 and 3.37 $mg/cm^2$, respectively, as shown in the spectrum of FIG. 9. The cell with a Sulphur loading of 2.13 $mg/cm^2$ was able to deliver a reversible capacity as high as 1218 mAh/g at a current density of 0.2 C for the first cycle with a low decay of 0.4% per cycle over 30 cycles. When the Sulphur loading increased to 3.37 $mg/cm^2$, an excellent retention of 94% was still achieved over 30 cycles with a high reversible capacity of 815 mAh/g.

As a conclusion, a simple carbon coating on the separator, suitable for large scale production, can significantly improve the cycle performance of Li—S batteries. In the example given above, the Sulphur cathodes showed high capacity with excellent rate capacity and stable cyclability even with high Sulphur content (70 wt %) and high Sulphur loading (up to 3.37 mg/cm2). The conductive carbon coating has multiple roles in enhancing electrochemical performance of the Li—S batteries. Firstly, it provides sufficient contact with the cathode surface, offering a high active material utilization. Secondly, it inhibits the migration of polysulphide intermediates, avoiding shuttle reactions. Furthermore, the improvements of the Li—S cells involved only a simple adjustment of the cell configuration by introducing a carbon coating on the separator, instead of complex carbon-Sulphur composite structure design or Sulphur-conductive polymer modification, enhancing the commercial viability of Li—S batteries. However, for the carbon coating, a balancing between the thickness and the carbon concentration inside the polymer matrix was necessary as well as a proper selection of the substrate material, in order to achieve optimized long term stable performance.

The invention claimed is:
1. A Li—S battery cell comprising
a Sulphur-containing cathode,
a Lithium-containing anode,
a non-woven glass fiber separator made of glass fibers having diameters below 2 microns, in between the cathode and anode
with an electrolyte on both sides of the glass fiber separator filling interspaces between the anode and the cathode;
wherein the glass fiber separator is coated with a carbon particle coating comprising a mixture of a polymer and electrically conductive nano-sized carbon particles for preventing polysulfides from migrating from the Sulphur-containing cathode to the Lithium anode,
wherein the glass fiber separator abuts the Sulphur-containing cathode, wherein the carbon particle coating is oriented towards the cathode and is in electrical contact with the cathode,
wherein the carbon particle coating has a thickness in the interval of 10-80 microns, and
wherein the carbon loading in the carbon particle coating is in the interval of 0.5-1 mg/cm2.

2. The Li—S battery cell according to claim 1, wherein the polymer is polyvinylidene difluoride, PVDF, and the weight ratio between the carbon and the polymer is between 7.5:2.5 and 5:5.

3. The Li—S battery cell according to claim 1, wherein a Sulphur content in the cathode is in the range of 60 to 80% by weight.

4. The Li—S battery cell according to claim 1, wherein a Sulphur loading on the cathode is in the interval of 0.7 to 4 mg/cm$^2$.

5. The Li—S battery cell according to claim 2, wherein a Sulphur content in the cathode is in the range of 60 to 80% by weight, and wherein a Sulphur loading on the cathode is in the interval of 0.7 to 4 mg/cm$^2$.

6. The Li—S battery cell according to claim 1, comprising a fluid-tight assembly of a casing comprising a bottom casing and a top casing, wherein the cathode, the separator, and the anode are arranged in a sandwich configuration between the bottom casing and the top casing, spacers adjacent the anode and wherein an elastic spring is arranged between the spacers sandwich configuration and the casing and configured to press the sandwich configuration together for improving the electrical contact between the Sulphur cathode and the carbon particle coating of the separator.

7. The Li—S battery cell according to claim 1, wherein the cathode comprises a Sulphur surface towards the separator, the Sulphur surface being provided without a carbon coating.

8. The Li—S battery cell according to claim 1, wherein the glass fiber separator has glass fibers with diameters of less than one micron.

9. The Li—S battery according to claim 6, wherein the glass fibers have diameters in a range of 0.1-0.4 microns.

10. The Li—S battery according to claim 1, wherein the glass fibers are nanofibers having a diameter of less than 1 micron.

11. The Li—S battery according to claim 1, wherein the thickness of the uncoated separator is less than 300 nm.

12. The Li—S battery according to claim 1, wherein the thickness of the uncoated separator is about 260 nm.

13. The Li—S battery according to claim 1, wherein the thickness of the carbon particle coating is 5-80 microns.

14. The Li—S battery according to claim 1, wherein the thickness of the carbon particle coating is 15-70 microns.

15. The Li—S battery according to claim 1, wherein the thickness of the carbon particle coating is about 60 microns.

* * * * *